Patented Apr. 21, 1931

1,802,297

UNITED STATES PATENT OFFICE

PAUL G. WILLETTS, OF WEST HARTFORD, CONNECTICUT

REFRACTORY

No Drawing.   Application filed December 11, 1926. Serial No. 154,313.

My invention relates to refractories and its general object is to provide improved refractory bodies composed mainly of artificial mullite ($3Al_2O_3.2SiO_2$) with a relatively small amount of glassy matrix, these bodies being produced by a process of burning and not by fusion, and having a homogeneous and dense internal structure in which all identity of the starting materials is destroyed during the burning process.

In my copending applications for Letters Patent, Serial No. 91,361, filed March 1, 1926 and Serial No. 147,848, filed November 11, 1926, I have described a new and improved system of preparing refractory bodies wherein hydrated aluminum oxid mineral and natural clay are mixed in such proportions as to react to produce the molecular ratio of three parts or more of alumina to two parts or less of silica, the mixture being treated by ceramic methods and, after firing, consisting mainly of mullite ($3Al_2O_3.2SiO_2$) with a small amount of highly silicious glassy matrix or slag, the exact quantity of which depends upon the characteristics and proportions of the starting materials.

My present invention aims to provide a simplified process for accomplishing substantially the same final result as is accomplished by the processes of my prior applications, referred to above, namely final products containing a preponderance of mullite, preferably at least 80% by weight, produced by a process of burning and accompanied by a small amount of slag. As in the final products described in my prior applications, the completed products of the present invention are dense and homogeneous bodies retaining their original shapes in use to a high degree, and having their internal pores of very small size and completely enclosed by dense walls, with the result that the products are substantially non-porous in effect. The internal structure of these products consists of innumerable microscopic mullite crystals, of an average estimated size of 0.05 mm. to 0.10 mm. in a haphazard matted formation bonded by the small amount of glassy matrix.

These productions are further characterized by the fact that the glassy portion or slag, which contains exceedingly small microscopic crystals of mullite, is mixed with the non-glassy or mullite portion in a thoroughly homogeneous manner, so that softening of the glassy portion does not cause substantial deformation of the body, and so that chemical solution of the glassy portion in contact with eroding agents, as in a glass melting furnace, for example, is exceedingly slow by reason of the fact that the hot glass or other solvent does not come in contact with any appreciable quantity of the glassy portion of the refractory body at any one time. Furthermore, the glassy matrix is of such composition that its softening point is comparatively very high.

These products are still further characterized by the fact that, although they are produced by a process of burning, according to ceramic methods, and not by fusion, all identity of the raw materials is lost, and new materials are formed by chemical rearrangement of the ingredients in the final form of the bodies, such new materials being, as stated above, a large preponderance of mullite ($3Al_2O_3.2SiO_2$) and a small amount of glassy matrix, which may be reduced below 20% by weight. These products are also similar to those produced according to my prior applications, in that their bulk specific gravity is above 2.5 and their true specific gravity at least 2.85, and in that they have an apparent porosity, throughout their mass, of less than 2% and a true porosity of less than 10%.

The process of my present application consists of the following steps:

1. Starting materials

A hydrated aluminum oxid mineral and a silicious clay are selected as starting materials. The hydrated aluminous mineral may suitably be natural diaspore or natural bauxite. The clay may be Grossalmerode German clay, or certain American clays, such as Mississippi clay from Crevi, Miss. Another clay which I have found well suited for present purposes is a finegrained silicious clay from Ouachita County, Arkansas, described as No. 23 on pages 24 and 25 of Technologic Paper No. 144 of the U. S. Bureau of Standards, Jan. 28, 1920. The aluminous and silicious ingredients are ground to great fineness, suitably at least fine enough to pass through a 325-mesh screen. Even finer subdivision is advantageous, as one of the most important features of my processes is the intimate mixing of the ingredients so as to bring their particles into close contact to favor the subsequent reaction.

2. Proportions

The finely divided ingredients are mixed in proportions depending upon the desired ratio of mullite to slag in the final product. Thus, if it is desired to produce a product consisting of about 87% of mullite and about 13% of glassy matrix or slag, two parts by weight of ground diaspore may be mixed with one part by weight of the ground Arkansas clay referred to above. These proportions may be varied within considerable limits, but the mixture should, in every case, contain a preponderance of alumina.

3. Mixing

The ingredients are mixed as intimately as possible. This is suitably done by adding 30% or more of water and passing the mixture through a pug mill until the desired degree of intimate mixture is obtained. The diaspore takes up water readily and the water carries with it into intimate contact with the diaspore a considerable proportion of the silica content of the clay, much of which is in free colloidal condition.

The mixed and pugged material is delivered from the pug mill in slabs, which are taken from the pug mill in suitable lengths for subsequent handling.

4. Drying

The slabs of material from the pug mill are dried in a humidity dryer so operated as to maintain the internal and external moisture content of the material substantially uniform, and the material is dried in the humid atmosphere of the drier to a degree of dryness at which pressing is best accomplished. Such degree of dryness may suitably be from 2% to 12% of water content.

5. Pressing

The dried slabs of material are then dry-pressed into the final shapes desired, such as blocks, tiles, or other shapes. I consider it advantageous to introduce the slabs of material into the press without crushing them, as this procedure reduces the entanglement of air in the pressed articles. However, the dried material may be broken down to any desired extent before being pressed.

6. Burning

The pressed articles are burned in the manner described in my copending applications identified above, namely, to a temperature below the melting point of crystalline mullite but at which complete transformation occurs at least superficially. The firing temperature may be about Cone 30, corresponding to about 3146° F. The burning temperature is subject to considerable variation.

During the burning operation, the ingredients react chemically and the starting materials disappear entirely. As stated above, these final products are composed principally of mullite, with an amount of glassy matrix determined by the purity of the starting materials and the proportions in which they are used.

The burning operation is accompanied by some shrinkage of the material but, after transformation, the products exhibit great stability in use and shrink only to a very slight extent.

The products of this process have the advantageous properties described herein, as well as other characteristic properties which are described more at length in my prior applications identified above.

I prefer to shape the articles by the dry-pressing method described above, as this process gives products having minimum burning shrinkage and maximum resistance to penetration by molten glass and other eroding agents. However, the articles may be shaped by other ceramic methods, if desired, such as wet-molding or casting from slip. A natural aluminous mineral is preferred as a starting material, but it is also possible to use purified aluminous material in place of some or all of the mineral.

The process described above is distinguished from the processes of my prior applications in that the preliminary preparation of grog is omitted, and the present process involves only one assembly of ingredients and one burning operation.

The products produced by the present process, like those described in my prior applications, are well suited for use in contact with molten glass and in communication with molten glass, as well as for other uses where resistance to high temperatures and to the solvent action of liquid melts or other eroding or corroding agents are important. Among the various uses of these products may be mentioned tank blocks and crown blocks for glass furnaces, blocks and bricks for use in metallurgical furnaces, and tiles and other shapes for use in regenerators and recuperators. When used in glass furnaces they may be insulated without unduly shortening their life and they wear away very slowly and evenly in contact with molten glass.

In the present specification and in the appended claims, the words "ceramic" and "ceramically produced" are intended to indicate that this invention is restricted to the art of fabricating articles by molding and baking clays and analogous substances without general fusion and without the presence of so much fluxing agents as would produce porcelain bodies. It is also to be understood that the expression "ceramically produced mullite" means crystalline aluminum silicate produced in situ in a body undergoing ceramic treatment not involving general fusion of the body.

I claim as my invention:

1. The process of making refractory bodies composed mainly of ceramically produced mullite ($3Al_2O_3.2SiO_2$) in homogeneous combination with a small amount of glassy matrix, which comprises grinding a natural mineral containing hydrated aluminum oxid and a natural silicious clay to such fineness as to enable said ingredients to combine with substantial homogeneity, intimately mixing said ingredients in selected proportions and in the presence of water, drying the mixed material to a degree of dryness suitable for pressing, pressing the dried material into articles of the shape desired for use, and heating said pressed articles to a temperature below the melting point of said mullite but high enough to induce the formation of said mullite and said matrix and to destroy substantially all identity of the starting materials.

2. The process of making refractory bodies composed mainly of ceramically produced mullite ($3Al_2O_3.2SiO_2$) in homogeneous combination with a small amount of glassy matrix, which comprises grinding a natural mineral containing hydrated aluminum oxid and a natural silicious clay to such fineness as to enable said ingredients to combine with substantial homogeneity, intimately mixing said ingredients in selected proportions and in the presence of water, drying the mixed material in a humid atmosphere to a degree of dryness suitable for pressing, pressing the dried material into articles of the shape desired for use, and heating said pressed articles to a temperature of the order of Cone 30, corresponding to 3146° F., to induce the formation of crystalline aluminum silicate and to destroy substantially all identity of the starting materials.

3. The process of making refractory bodies composed mainly of ceramically produced mullite ($3Al_2O_3.2SiO_2$) in homogeneous combination with a small amount of glassy matrix, which comprises grinding a natural mineral containing hydrated aluminum oxid and a natural silicious clay to such fineness as to enable said ingredients to combine with substantial homogeneity, intimately mixing said ingredients in selected proportions and in the presence of water, forming the mixed material into masses suitable for handling, drying said masses to a degree of dryness suitable for pressing, pressing said masses into articles of the shape desired for use, and heating said pressed articles to a temperature below the melting point of said mullite but high enough to induce the formation of said mullite and said matrix and to destroy substantially all identity of the starting materials.

4. The process of making refractory bodies composed mainly of ceramically produced mullite ($3Al_2O_3.2SiO_2$) in homogeneous combination with a relatively small amount of glassy matrix, which comprises grinding natural diaspore and a natural silicious clay to impalpable fineness of the order of 325-mesh, mixing intimately, and in the presence of water, about two parts by weight of the ground diaspore and about one part by weight of the ground clay, drying the mixed material to a degree of dryness suitable for pressing, pressing the dried material into articles of the shape desired for use, and heating said articles to a temperature of the order of Cone 30, corresponding to 3146° F., to induce the formation of crystalline aluminum silicate and to destroy substantially all identity of the starting materials.

5. The process of making refractory bodies comprising the steps of preparing a batch by intimately mixing finely ground unburned silicious clay with a preponderance of finely ground unburned minerals consisting principally of aluminum, oxid, dry pressing the unburned batch into the desired shapes, and thereafter firing the shapes thus formed to a temperature short of the melting point of mullite, but sufficiently high to cause their constituents to lose their identity and to produce articles of relatively low porosity consisting chiefly of mullite and a small amount of glassy matrix.

6. The process of making refractory bodies comprising the steps of preparing a batch by intimately mixing unburned silicious clay ground to pass through a screen of approximately 325 mesh with a preponderance of unburned mineral consisting principally of aluminum oxid, ground to pass through a screen of approximately 325 mesh, dry pressing the unburned batch into the desired shapes, and firing the shapes thus formed to approximately 3146° F. to produce articles of low porosity, consisting principally of mullite and a small amount of glassy matrix, and to destroy the identity of the starting materials.

7. The process of making refractory bodies comprising, preparing a batch for the bodies by the single assembly of a finely ground unburned natural silicious clay with a preponderance of an unburned natural mineral consisting principally of aluminum oxid, intimately mixing the ingredients of the batch, forming the batch into articles of desired shape by dry pressing, and firing the articles thus formed to a temperature short of the melting point of mullite, but sufficiently high to cause the constituents thereof to lose their identity and to be transformed into material consisting chiefly of mullite and a small amount of glassy matrix.

8. The process of making refractory bodies comprising, preparing a batch for the bodies by the single assembly of unburned natural silicious clay ground to pass through a screen of approximately 325 mesh with a preponderance of an unburned natural mineral consisting principally of aluminum oxid ground to pass through a screen of approximately 325 mesh, intimately mixing the ingredients of the batch, forming the batch into articles of the desired shape by dry pressing, and firing the articles thus formed to approximately 3146° F. to produce articles of low porosity, consisting principally of mullite and a small amount of glassy matrix, and to destroy the identity of the starting materials.

9. The process of making refractory bodies comprising, preparing a batch for the bodies by the single assembly of unburned silicious clay ground to pass through a screen of approximately 325 mesh with a preponderance of unburned mineral consisting principally of aluminum oxid ground to pass through a screen of approximately 325 mesh, intimately mixing the ingredients in the presence of water, forming the mixed material into masses suitable for handling, drying the said masses to a degree of dryness suitable for pressing said masses, pressing the said masses while dry, into articles of the desired shape, and firing the articles thus formed to approximately 3146° F. to cause the identity of the starting materials to be destroyed and transformed into material consisting principally of mullite and a small amount of glassy matrix.

Signed at Hartford, Conn., this 26th day of November, 1926.

PAUL G. WILLETTS.